Dec. 24, 1935.  P. E. BARKHAUSEN ET AL  2,025,149
HANDLE FOR STORAGE BATTERY CASES
Filed July 18, 1934
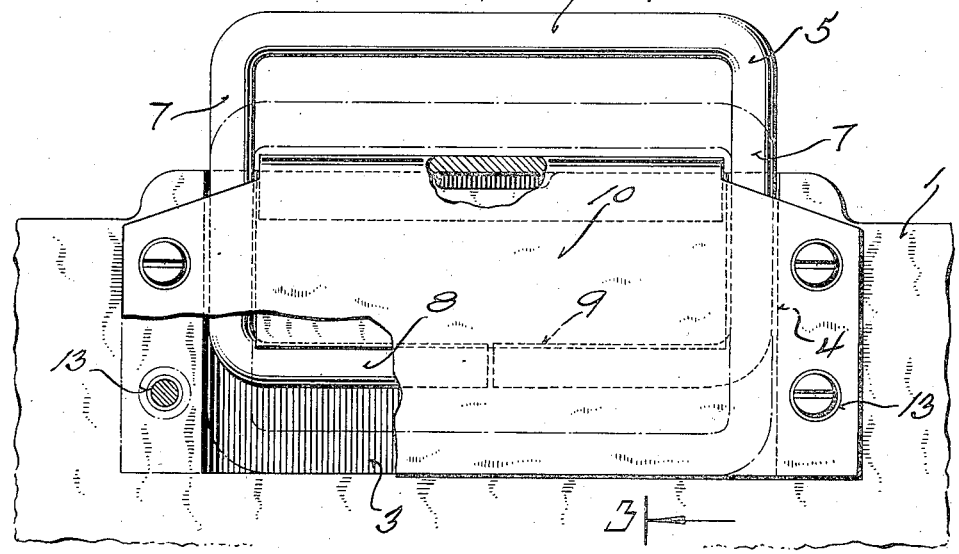
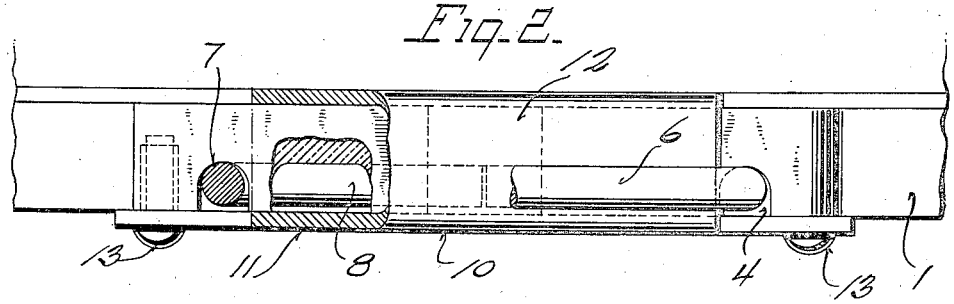
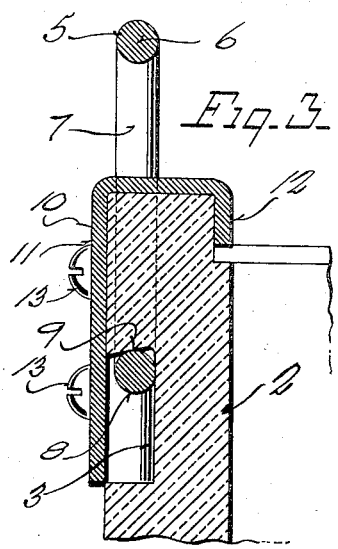
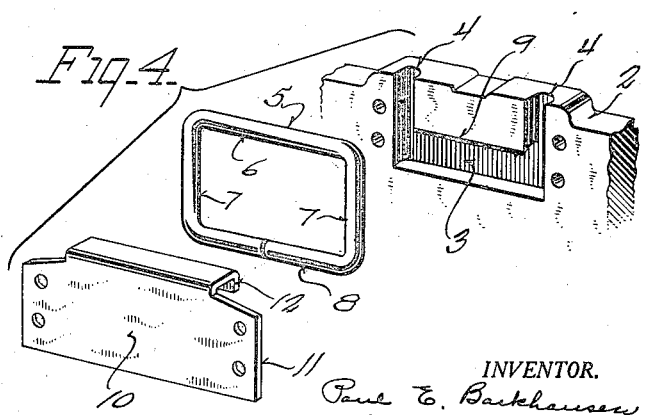
INVENTOR.
Paul E. Barkhausen
and Carl H. Krug
BY
ATTORNEYS Patented Dec. 24, 1935

2,025,149

UNITED STATES PATENT OFFICE 2,025,149

HANDLE FOR STORAGE BATTERY CASES

Paul E. Barkhausen and Carl H. King, Milwaukee, Wis., assignors to Globe-Union Mfg. Co., Milwaukee, Wis., a corporation of Wisconsin Application July 18, 1934, Serial No. 735,738

5 Claims. (Cl. 16—115)

This invention relates in general to storage batteries and more particularly to handles therefor, the invention proposing to combine a handle or preferably a pair of handles with the battery structure in such manner that the handles are permanently assembled therewith and yet are substantially enclosed by and contained within the confines of the battery ordinarily, although when the battery is to be handled the handles are readily accessible to facilitate manipulation thereof.

In connection with said vehicles such as busses, heavy trucks, or the like, the space provided for the battery does not make it practical to use handles which extend much if any beyond the confines of the battery proper and yet the weight of such heavy duty batteries is such that it is extremely difficult to install and remove the same without providing some handling means.

In general, the present invention proposes to so construct and organize a handle and battery container structure as to facilitate handling of the battery without materially increasing the amount of space required for its installation, storage or shipment and without introducing any undesirable changes or complications in the structure of the battery or of its container.

While obtaining the advantages mentioned, the present invention also provides a structure which may be readily and conveniently produced without materially increasing the cost of production and while providing a construction which is durable and entirely compatible with the requirements of a battery and its use.

Other objects and advantages reside in certain novel features of the construction, arrangement and combination of parts which will be hereinafter more fully described and particularly pointed out in the appended claims, reference being had to the accompanying drawing, forming a part of this specification, and in which:

Figure 1 is a fragmentary view in end elevation showing a battery equipped with a handle embodying the present invention, parts being broken away and parts being shown in section for the sake of illustration;

Figure 2 is a view similar to Figure 1 but illustrating the structure shown in Figure 1 in top plan;

Figure 3 is a fragmentary view in vertical section taken on line 3—3 of Figure 1; and Figure 4 is a group view in perspective illustrating the elements of the present invention prior to assembly.

Referring to the drawing, the numeral 1 designates generally the container of a storage battery which, as usual, is molded from suitable material, ordinarily a rubber composition.

The end walls 2 of the container of the battery have formed therein during the molding operation a transversely extending recess 3 located at a distance below the top of the end wall. At the ends of the recess 3 vertical grooves 4 are provided and extend from the recess up through the top of the end wall. Bail-like handles designated generally at 5 are interfitted with the recesses and groove of the end walls, one such handle being associated with each end wall. Each handle 5 consists of a closed loop or bail of generally rectangular form and thus provides a portion 6 adapted to be gripped, shank portions 7 slidable in the grooves 4, and a battery engaging portion 8 shiftable in the recess 3 and in the operative position of the handle engageable with the shoulder 9 presented at the top of the recess 3. This shoulder 9 is preferably undercut, that is, inclines as illustrated in Figure 3 in order to tend to maintain the battery engaging portion 8 of the handle in supporting relation to the battery structure.

In order to retain the handles assembled with the end walls retaining or keeper plates designated at 10 are provided, the plates being constructed of sheet metal of suitable gauge and having body portions 11 fitting flatly against the wall and covering the recesses 3 and grooves 4. An angular flange 12 is integrally formed with the top of each plate 10 and embraces the top of the end wall as shown in the drawing. Any suitable means is provided for securing the plates 10 in position. For example, screws 13 may be provided.

With the construction illustrated, the handles are slidably interfitted with the structure of the end walls and due to their own weight normally they drop down into the recesses and are substantially contained within the confines of the battery container and are housed and enclosed thereby and by the plates 10. The gripping portions 6 of the handles are, however, readily accessible and may be lifted and then gripped to facilitate installation, removal or handling of the battery.

While I have shown and described one construction in which the invention may be embodied, it is to be understood that the construction shown has been selected merely for the purpose of illustration and that various changes in the size, shape and arrangement of the parts may be made, as will be understood by those skilled in the art, without departing from the spirit of the invention or the scope of the subjoined claims.

The invention claimed is:

1. A storage battery case having a wall provided with a recess spaced from the top thereof and also having a groove leading from the recess through the top of the wall, a handle having a shanked portion slidable in said groove and a case engaging portion disposed in the recess and cooperable with a wall thereof in its operative position to effectively interconnect the handle and the case, said handle also having a portion disposed exteriorly of the groove and adapted to be gripped, said recess being sufficiently larger than the case engaging portion to provide for the accommodation of the handle, shank and case engaging portion by the recess and the groove in inoperative position of the handle.

2. A storage battery case having an end wall provided with a transverse recess spaced from the top thereof, said end wall also having vertical grooves extending from the ends of said recess up through the top of the wall, a bail-like handle slidably interfitted with said grooves and with the recess and having a gripping portion overlying the top of the end wall, said recess being of such extent as to allow all portions of the handle except the gripping portion to be enclosed in the grooves and recess in the inoperative position of the handle.

3. A storage battery case having an end wall provided with a transverse recess spaced from the top thereof, said end wall also having vertical grooves extending from the ends of said recess up through the top of the wall, a bail-like handle slidably interfitted with said grooves and with the recess and having a gripping portion overlying the top of the end wall, said recess being of such extent as to allow all portions of the handle except the gripping portion to be enclosed in the grooves and recess in the inoperative position of the handle, in combination with a cover plate overlying the grooves and the recess and secured to the end wall to maintain the handle in the grooves and recess.

4. A battery casing having a pocket molded therein, one of the walls of the pocket presenting a shoulder, and a handle having a portion slidably interfitted in said pocket and engageable with the shoulder to provide for connection between the handle and the case in the operative position of the handle, said handle having a gripping portion exposed exteriorly of the pocket and resting flatly on the case in the inoperative position of the handle.

5. A battery case having a wall formed with a transverse recess below the top of the same and having grooves therein extending from the recess up through the top of the wall and a loop-like handle including side bars connected at their upper ends by a top gripping bar and having inturned lower ends, the side bars being slidably fitted in the grooves and the inturned lower ends being loosely fitted in the recess so that in the inoperative position of the handle the top bar will rest on the top of the wall whereas in the operative position of the handle the inturned lower ends will have supporting engagement with the top wall of the recess, and means for retaining the handle in the recess and grooves.

PAUL E. BARKHAUSEN.
CARL H. KING.